United States Patent Office 2,927,014
Patented Mar. 1, 1960

2,927,014

METHOD FOR KILLING PLANTS

Lewis Edward Goyette, Richmond, Va., assignor to Virginia-Carolina Chemical Corporation, Richmond, Va., a corporation of Virginia No Drawing. Application February 14, 1957
Serial No. 640,093

3 Claims. (Cl. 71—2.3)

This invention relates to a method of controlling the growth of undesirable plants.

Chemical plant-growth substances are substances which affect the growth of one or more of the plant forms including seeds, germinating seeds, seedlings, immature plants and mature plants. The growth-affect may be inhibition, retardation, acceleration or killing. In the last instance the substance is known as a herbicide.

Chemical herbicides are classified generally according to the type of activity they possess. A given compound may possess more than one type of activity and its action may change with a change in application rate. Any compound which shows slight activity at a low rate of application will show more activity at a higher rate.

The activities are generally classified as follows:

1. Preemergence—
   a. Non-selective
   b. Selective
2. Postemergence—
   a. Non-selective
   b. Selective Preemergence herbicides are applied to the soil before the seed germinates. The compound, to be effective, should work in one or a combination of the following ways.

(1) Penetration into the soil should not be far enough to contact the crop seed if the compound is phytotoxic to them.

(2) The compound should be decomposed before the crop seed germinates if the compound is phytotoxic to the germinated seed.

(3) The compound should be selective, i.e., it should kill unwanted seed or seedlings but not harm the crop seed.

Some compounds are effective preemergence herbicides even though they are phytotoxic to all seeds. This is because crop seed are generally planted deeper than one inch. Unwanted weeds generally will germinate only from seeds that are close to the surface. Thus, a compound of low penetration would kill seed in the upper layer but not harm the deeper planted crop seed. If the compound is phytotoxic to the epicotyl of the crop seed, then it must be decomposed by the time the crop seed germinate and begin to grow.

The most effective preemergence herbicide is the selective one. If the compound will kill seed, germinating seed and seedlings of the unwanted weeds but do no harm to the seed, germinating seed or seedlings of the crop, then there is no danger from over-penetration. The crop is thus allowed to germinate and grow and the unwanted weeds are killed.

Postemergence herbicides are applied after the crop and weeds have obtained substantial growth. A nonselective postemergence herbicide is called a general contact herbicide. That is, it kills any plant form that it contacts if the dosage is sufficient.

Selective postemergence herbicides do not harm the crop but kill the weeds. They may be divided into two classes:

(1) Those which are selective on a rate basis, i.e. phytotoxic to weeds but not the crop at a low rate, but phytotoxic to both at a higher rate.

(2) Those which are inherently selective. These compounds show no harm to crops at any reasonable rate but kill weeds at reasonable rates of application.

Most compounds that are found to have herbicidal activity are non-selective. That is, at a given application rate, the compound is just as liable to kill the crop as it is the weeds. It is only rarely that a selective compound is found.

Generally, selectivity is between broad-leaved and narrow-leaved plants. Both of these classes contain weeds and crops. Thus, in a broad-leaved crop a selective compound would kill narrow-leaved weeds but would allow broad-leaved weeds and the crop to grow. The opposite is true of a compound selective to narrow-leaved plants.

Some compounds, however, exhibit specific selectivity for a certain plant. If this plant is a crop plant, then the compound is highly valuable. The ideal compound would be one selective to all crops but phytotoxic to all weeds.

The present invention relates to the use of compounds of the general formula

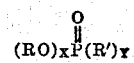

in which R and R$^1$ each represent radicals selected from the group consisting of alkyl, aryl, alkaryl, aralkyl, substituted aryl and substituted aralkyl radicals and X and Y are positive whole numbers whose sum is 3. These compounds may be divided into two groups (1) the phosphonates in which X is 2 and Y is 1 and (2) the phosphinates in which X is 1 and Y is 2. I have found generally that both the phosphonates and the phosphinates kill i.e. that they are herbicides with respect to germinating seeds, seedlings and plants, both mature and immature and that they differ from each other only with respect to seeds i.e. the phosphinates also kill seeds whereas the phosphonates do not kill seeds. This invention therefore embraces the use of the phosphinates as herbicides for all of the plant forms and the use of both the phosphonates and the phosphinates as herbicides for all of the plant forms excepting seeds.

The foregoing general statements are based upon and supported by the following experimental data.

METHOD OF TESTING (a) *Preemergence.*—The crop seed are cotton and corn. Turnip and rye grass seed are used to simulate weeds. Four crop seed are planted in a sub-irrigated can at one-inch depth and covered. Twenty-five each of the turnip and rye grass seed are spread over the top of the soil and covered lightly. The planted cans are sub-irrigated for 24 hours prior to application of the test compound.

The compound is applied at the rate of 16 lbs. per acre after being dissolved in a xylene-"Atlox" mixture. Results are taken seven to ten days after application.

By counting the number of weeds in a healthy condition and comparing to an untreated planting, a percent control is obtained.

The word "Atlox" used above is the registered trademark of Atlas Powder Co. and is applied to a series of surface-active agents, i.e. emulsifiers and wetting agents adapted for use with agricultural chemicals including insecticides and herbicides.

(b) *Postemergence.*—The planting is the same as for preemergence. The plants are allowed to grow for ten days. The test compound is then sprayed on the foliage at an approximate rate of 2 lbs. per acre. After seven to tend days results are taken. A visible estimation of the degree of phytotoxicity is recorded as dead, severe, moderate, slight or none.

*Table I*

PREEMERGENCE AND POSTEMERGENCE RESULTS WITH DIALKYL ALKYLPHOSPHONATES $$(RO)_2\overset{O}{\underset{\|}{P}}(R')$$

| Compound No. | R Group | R' Group | Preemergence Results | | Postemergence Results | | | |
|---|---|---|---|---|---|---|---|---|
| | | | Turn. | R.G. | Turn. | R.G. | Corn | Cotton |
| 1 | ethyl | butyl | 0 | 0 | Moderate | Moderate | Moderate | Moderate. |
| 2 | do | pentyl | 50 | 50 | Slight | Slight | Slight | Slight. |
| 3 | do | hexyl | 85 | 37 | do | do | do | Do. |
| 4 | do | heptyl | 85 | 12 | do | do | do | Do. |
| 5 | do | 2-ethylhexyl | 92 | 33 | Dead | Dead | Dead | Dead. |
| 6 | do | octyl | 37 | 56 | do | Mod. Sev. | Sev | Slight. |
| 7 | butyl | butyl | 50 | 25 | do | Dead | Dead | Dead. |
| 8 | do | octyl | 25 | 38 | do | do | do | Severe. |
| 9 | 2-ethylhexyl | ethyl | 10 | 50 | do | do | do | Dead. |
| 10 | hexyl | hexyl | 0 | 0 | do | Severe | do | Mod. Sev. |
| 11 | 2-ethylhexyl | 2-ethylhexyl | 30 | 20 | do | Mod | Mod | Severe. |
| 12 | octyl | octyl | 19 | 36 | Severe | do | do | Mod. |

*Table II*

PREEMERGENCE AND POSTEMERGENCE RESULTS WITH PHOSPHONATES OTHER THAN DIALKYL ALKYL $$(RO)_2\overset{O}{\underset{\|}{P}}(R')$$

| Compound No. | R Group | R' Group | Preemergence Results, Percent Killed | | Postemergence Results | | | |
|---|---|---|---|---|---|---|---|---|
| | | | Turn. | R.G. | Turn. | R.G. | Corn | Cotton |
| 13 | allyl | allyl | 0 | 0 | Mod | Slight | Slight | Slight. |
| 14 | 2-bromoethyl | 2-bromoethyl | 0 | 0 | Moderate | Moderate | Moderate | Moderate. |
| 15 | ethyl | phenyl | 50 | 50 | Sev.-Dead | None | None | None. |
| 16 | do | 3,4-dichlorobenzyl | 0 | 75 | Slight | Slight | Slight | Slight. |
| 17 | do | 2,4-dichlorobenzyl | 50 | 50 | do | do | do | Do. |
| 18 | butyl | do | 15 | 20 | Severe | Severe | Dead | Dead. |
| 19 | ethyl | 1-naphthylmethyl | 0 | 50 | Slight | Slight | Slight | Slight. |
| 20 | do | 2-(1-naphthyl)ethyl | 0 | 0 | Dead | Dead | Dead | Dead |
| 21 | do | trichloroacetyl | 72 | 41 | Slight | Slight | do | Do. |
| 22 | 2-butoxyethyl | 2-butoxyethyl | 0 | 0 | Dead | Mod | Sev | Mod.-Sev. |

Table III
PREEMERGENCE AND POSTEMERGENCE RESULTS WITH PHOSPHINATES
$$(RO(\overset{O}{\underset{\|}{P}})R')_2$$

| Compound No. | R Group | R' Group | Preemergence Results | | Postemergence Results | | | |
|---|---|---|---|---|---|---|---|---|
| | | | Turn. | R.G. | Turn. | R.G. | Corn | Cotton |
| 23 | ethyl | butyl | 56 | 7 | Slight | Slight | Slight | Slight. |
| 24 | isopropyl | do | 64 | 45 | Dead | Mod | Mod | Mod. |
| 25 | butyl | do | 100 | 75 | do | Dead | Dead | Do. |
| 26 | hexyl | do | 83 | 56 | do | do | do | Dead. |
| 27 | ethyl | 2-ethylhexyl | 96 | 82 | do | do | do | Do. |
| 28 | butyl | do | 42 | 51 | do | do | do | Do. |
| 29 | 2-ethylhexyl | do | 0 | 0 | do | do | Sev.-Dead | None. |
| 30 | ethyl | 1-butylamino-2-ethylhexyl octyl. | 20 | 20 | do | Mod | Dead | Dead. |
| 31 | do | phenyl 2-ethylhexyl | 0 | 0 | do | Dead | Sev.-Dead | Mod.-Sev. |
| 32 | 2,4-dichlorophenyl. | butyl | 33 | 13 | do | Sev.-Dead | do | Sev.-Dead. |
| 33 | butyl | isobutyl | 100 | 80 | do | None | Mod.-Sev. | Dead. |

When a compound has shown good activity at the initial screening concentration, it is retested at one-half the original rate in the postemergence test. The following results were obtained with the phosphonates in retesting.

Table IV

| Compound No. | Turnips | Rye Grass | Corn | Cotton |
|---|---|---|---|---|
| 9 | Dead | Sev.-Dead | Sev.-Dead | Mod.-Sev. |
| 7 | Mod | Slight | Slight | Slight. |
| 10 | Sev | Mod | Mod | Do. |
| 8 | Dead | Dead | Dead | Sev. |
| 5 | Slight | Slight | Slight | Slight. |

If the compound still has good activity at this lower rate, it is then tested in the field. Various weed seed are planted as well as crop seed. After the plantings have obtained substantial growth, they are sprayed with the test compounds. The following results were obtained for postemergence application of the compounds listed.

Table V

| Compound No. | Lbs./Acre | Percent Control [1] | | Corn | Cotton | Soybeans | Peanuts |
|---|---|---|---|---|---|---|---|
| | | Ragweed, Mustard, Lambs Quarter, Turnips | Rye Grass and Other Grasses | | | | |
| 9 | 4 | 50 | 25 | Slight | Mod | Mod.-Slight | Dead-Sev. |
| | 8 | 75 | 50 | Mod.-Slight | Sev | Dead-Sev | Dead. |
| 10 | 8 | 90 | 50 | do | Sev | Dead | Do. |
| 8 | 4 | 50 | 50 | do | Sev | Dead-Mod | Sev. |
| | 8 | 75 | 50 | Mod | Sev.-Mod | Mod | Sev.-Mod. |
| 5 | 4 | 25 | 0 | Slight | Mod | Slight | Slight. |
| | 8 | 75 | 25 | do | Dead-Mod | do | Do. |

[1] Visual estimates.

The compound No. 9 was tested as a general contact herbicide at rates of 20, 40 and 80 lbs./acre. Control of broad leaf plants and grasses at these rates were, respectively 50%, 90% and 100%.

Several of the phosphinate compounds were retested at one-half the original rate for postemergence activity. The results were as follows:

Table VI

| Compound No. | Turnips | Rye Grass | Corn | Cotton |
|---|---|---|---|---|
| 25 | Dead | Sev.-Dead | Mod | None. |
| 26 | do | do | Mod | Mod. |
| 27 | do | Dead | Sev.-Dead | Sev.-Dead. |
| 28 | do | do | Dead | Mod.-Sev. |
| 31 | do | do | do | Sev. |

Compound No. 27 was tested in the field for postemergence activity. The 4 lbs./acre rate was made on two plots.

Table VII

| Compound No. | Lbs./Acre | Percent Control [1] | | Degree of Damage [1] | | | |
|---|---|---|---|---|---|---|---|
| | | Ragweed, Mustard, Lambs Quarter, Turnips | Rye Grass and Other Grasses | Corn | Cotton | Soybeans | Peanuts |
| 27 | 2 | 50 | 0 | None | Mod | Sev | Dead. |
| | 4 | 75 | 50 | Slight-None | Dead-Sev | Dead-Sev | Do. |
| | 4 | 75 | 75 | Mod | Mod | Dead-Mod | Sev.-Mod. |
| | 8 | 90 | 75 | Mod | Dead-Sev | Dead-Sev | Mod. |

[1] Visual estimates.

Several of the phosphinate compounds were tested at low rates for preemergence activity. The results are given in the table below.

Table VIII

| Compound No. | Lbs./Acre | Percent Control | |
|---|---|---|---|
| | | Turnips | Rye Grass |
| 26 | 8 | 100 | 82 |
| | 4 | 75 | 38 |
| 25 | 8 | 100 | 96 |
| | 4 | 90 | 56 |
| 33 | 8 | 80 | 60 |
| | 4 | 50 | 20 |

This test was made in greenhouse flats about one foot square.

Compound 27 was tested for preemergence activity in the field. The results were as follows:

Table IX

| Compound No. | Lbs./Acre | Percent Control | | Degree of Damage | | | |
|---|---|---|---|---|---|---|---|
| | | Mustard, Turnips | Grasses | Corn | Cotton | Soybeans | Peanuts |
| 27 | 8 | 90 | 50 | 0 | 0 | 0 | 0 |
| | 16 | 100 | 75 | 0 | 0 | 0 | 0 |

The results in the following Table X show the effect of some of the phosphinate compounds on seed germination. In each test 25 rye grass and 25 turnip seed were used. Several milliliterss of a solution of the test compound in an organic solvent was placed in a Petri dish. The solvent was evaporated. Fifteen ml. of water was then added. Enough of the organic solution was used to give concentrations of the compound of 1000, 500 and 100 p.p.m. in the 15 ml. of water. Filter paper was placed in the dish and the seed were added. The dishes were covered and held at 28° C. for 96 hours. Each compound was tested in four dishes and four untreated controls were used. Results were taken as percent inhibition of germination compared to the untreated controls.

Table X

| Compound No. | 1,000 p.p.m. | | 500 p.p.m. | | 100 p.p.m. | |
|---|---|---|---|---|---|---|
| | Turnips | Rye Grass | Turnips | Rye Grass | Turnips | Rye Grass |
| 23 | 79 | 53 | 66 | 24 | 13 | 7 |
| 27 | 82 | 72 | 68 | 31 | 19 | 16 |
| 31 | 94 | 100 | 100 | 100 | 25 | 58 |
| 24 | 93 | 66 | 66 | 60 | 10 | 8 |
| 25 | 100 | 100 | 99 | 95 | 83 | 60 |
| 26 | 100 | 100 | 100 | 100 | 85 | 43 |
| 28 | 53 | 59 | 29 | 33 | 4 | 8 |
| 32 | 94 | 88 | 81 | 92 | 46 | 21 |
| 33 | 100 | 100 | 81 | 83 | 27 | 30 |
| 29 | 50 | 47 | 25 | 27 | 2 | 7 |

I claim:

1. A method for killing undesirable plants which comprises contacting the plant at any stage of its growth with a herbicidal amount of a compound selected from the group represented by the formula

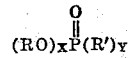

wherein R and R' represent alkyl groups each containing from 2 to 8 carbon atoms and X and Y are positive whole numbers whose sum is 3.

2. A method as defined in claim 1 in which X is 1 and Y is 2.

3. A method as defined in claim 1 in which X is 2 and Y is 1.

References Cited in the file of this patent

UNITED STATES PATENTS

| | | |
|---|---|---|
| 2,666,078 | Ferguson | Jan. 12, 1954 |
| 2,681,920 | Van Winkle et al. | June 22, 1954 |
| 2,714,064 | Morris et al. | July 26, 1955 |
| 2,722,479 | Mangham | Nov. 1, 1955 |
| 2,754,242 | Kosolapoff | July 10, 1956 |

OTHER REFERENCES

Zimmerman, in Indus. and Engr. Chem. May 1943, vol. 35, No. 5, pp. 590 to 601.

Crocker: "Growth of Plants," 1948, page 226.

Pastac et al. in "Chemical Abstracts," vol. 49, col. 1878(b), 1955, and column 14110(c).